United States Patent [19]

Natsume

[11] Patent Number: 4,580,145

[45] Date of Patent: Apr. 1, 1986

[54] THERMAL PRINTER

[75] Inventor: Yukihito Natsume, Nagoya, Japan

[73] Assignee: Brother Industries, Ltd., Nagoya, Japan

[21] Appl. No.: 677,808

[22] Filed: Dec. 4, 1984

[30] Foreign Application Priority Data

Dec. 7, 1983 [JP] Japan ................................ 58-231956

[51] Int. Cl.$^4$ ............................................ G01D 15/10

[52] U.S. Cl. ......................... 346/76 PH; 219/216 PH

[58] Field of Search ......................... 346/76 PH, 76 R; 219/216 PH; 400/120; 250/317.1, 318, 319

[56] References Cited

U.S. PATENT DOCUMENTS 4,387,380 6/1983 Asakura et al. ................ 346/76 PH

FOREIGN PATENT DOCUMENTS 0030846 3/1979 Japan ............................. 346/76 PH

*Primary Examiner*—E. A. Goldberg

*Assistant Examiner*—A. Evans

*Attorney, Agent, or Firm*—Kane, Dalsimer, Kane, Sullivan and Kurucz

[57] ABSTRACT

A thermal printer including a thermal head which is caused to accumulate heat while being kept away from a recording sheet for a predetermined period of time before commencing a printing operation while a unit of printing data is transferred to the thermal printer. The thermal printer commences printing of characters after the thermal head has been sufficiently warmed to enable clear and well-defined characters to be printed on the recording sheet.

4 Claims, 3 Drawing Figures

THERMAL PRINTER

BACKGROUND OF THE INVENTION (1) Field of the Invention

This invention relates to a thermal printer of the type in which printing of data is carried out on a sheet of heat-sensitive paper or a sheet of ordinary paper by thermal transfer-ribbon.

(2) Description of the Prior Art

Generally, in thermal printers of the prior art, a thermal head maintained in pressing engagement with a recording sheet is moved in reciprocatory movement along a line of characters being printed as printing data is inputted. Printing is effected either by causing a sheet of heat-sensitive paper serving as a recording sheet to develop a color by letting a multiplicity of heat generating elements of the thermal head generate heat selectively in accordance with the data for one line of characters or melting a coat of thermo-melt ink on a thermal transfer-printing ribbon by the heat generated by the heat generating elements and printing characters on a sheet of ordinary paper serving as a recording sheet. When printing of one line of characters is finished, the thermal head is moved away from the recording sheet; the recording sheet is fed or advanced by one line; and printing of characters on a new line is started. In this way, printing of characters on the recording sheet is carried out successively one line after another.

In the thermal printers of the prior art, difficulties have been experienced in raising the temperature of the thermal head to a sufficiently high level to perform printing satisfactorily. This is because the thermal head is low in temperature prior to initiation of printing or the temperature of the thermal head falls while the line changing operation is being performed. This inevitably results in that the characters printed during initial stages of printing are not well-defined and clear or the quality of the printing characters deteriorates.

SUMMARY OF THE INVENTION

This invention has been developed for the purpose of obviating the aforesaid disadvantage of the prior art. Accordingly, the invention has as its object to provide a thermal printer of simple construction capable of printing data with clear and well-defined characters on a recording sheet from the beginning to the end of each line of characters to thereby enable the data to be recorded to provide a printed record of high quality.

According to the invention, there is provided a thermal printer comprising a thermal head for printing on a recording sheet data that are inputted to the thermal printer from an external device. The improvement comprises means for controlling a printing operation in such a manner that as a unit of printing data is inputted to the thermal printer, a current is passed to the thermal head for a predetermined period of time while the thermal head is being maintained out of engagement with the recording sheet, before printing of said unit of printing data is commenced.

Other objects, features and advantages of the invention will become apparent from the description set forth hereinafter when considered with reference to the accompanying drawings.

DESCRIPTION OF THE PREFERRED EMBODIMENT

A preferred embodiment of the invention will now be described by referring to the accompanying drawings.

Figure 1:
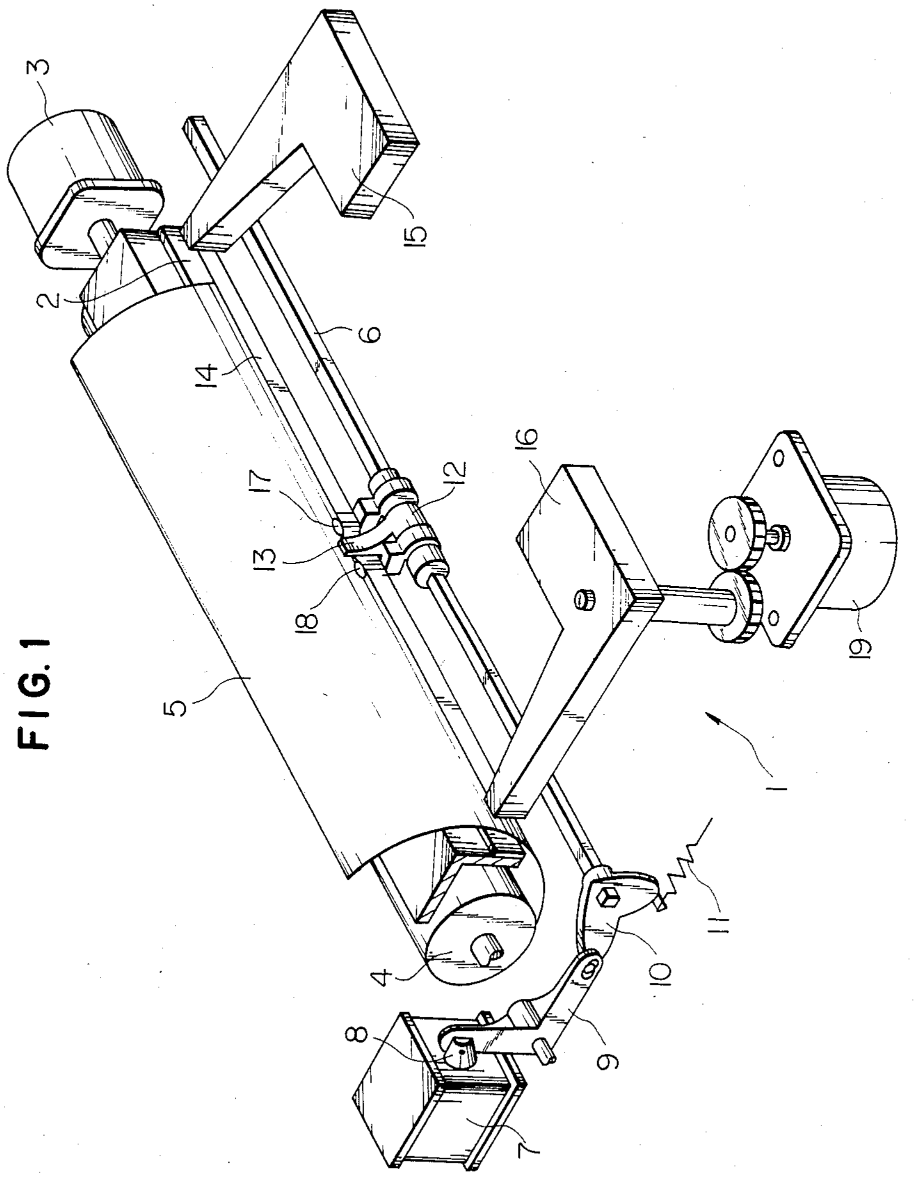
FIG. 1 is a schematic perspective view of a thermal printer in which the present invention is incorporated.

Referring to FIG. 1, a thermal printer 1 using a thermal transfer-printing ribbon comprises a platen 2 mounted on a frame, not shown, for supporting a recording sheet 5 placed thereon. A support drum 4 is rotated by a sheet advance step-motor 3 drivingly connected thereto. The frame also supports a rotatable guide shaft 6 which is disposed parallel with the platen 2. A plunger 8 of a solenoid 7 is connected to the guide shaft 6 via a first lever 9 and a second lever 10. The second lever 10 urges the guide shaft 6 to move counterclockwise in FIG. 1 by the biasing force of a tension spring 11. Energization of the solenoid 7 moves the plunger 8 and causes the guide shaft 6 to move clockwise against the biasing force of the tension spring 11. A carriage 12 is supported for reciprocatory movement by the guide shaft 6 and is moved by a drive belt, not shown, connected thereto and to a carriage drive step-motor, not shown, as the carriage drive step-motor is actuated. The carriage 12 supports a thermal head 13 including a multiplicity of heat generating elements, not shown, arranged in a direction perpendicular to lines of printed characters on the recording sheet 5 and selectively caused to generate heat. A coat of thermo-melt ink on a thermal transfer-printing ribbon 14 is melted onto the recording sheet 5 by the heat generated by the selected heat generating elements of the thermal head 13 to print characters in a dot matrix in accordance with the inputted printing data. The thermal transfer-printing ribbon 14 is contained in a ribbon supply cassette 15 which, together with a ribbon takeup cassette 16, is supported by the frame. The thermal transfer-printing ribbon 14 is pulled out from the ribbon supply cassette 15 and guided in front of the thermal head 13 by pins 17 and 18, before being wound on the ribbon takeup cassette 16 which is connected to a ribbon drive motor 19. The ribbon drive motor 19 is actuated after one line of characters is printed to rotate in accordance with the length of the line of printed characters, to advance the thermal transfer-printing ribbon 14.

Figure 2:
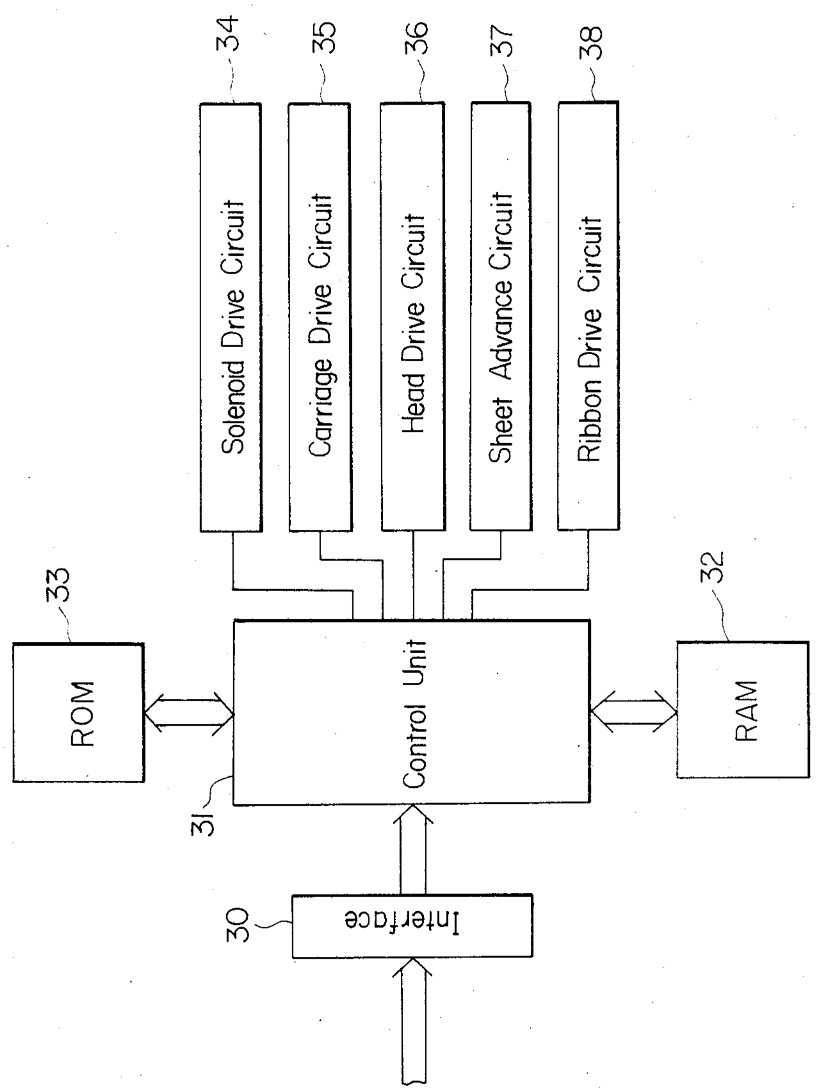
FIG. 2 is a block diagram of the thermal printer shown in FIG. 1, showing its electronic components.

Referring to FIG. 2, as printing data are inputted from an external device, not shown, to the thermal printer 1 via an interface 30, a control unit 31 successively stores the inputted printed data to a random access memory (RAM) 32 which allows rewriting. When a unit of printing data corresponding to one line of characters has been stored in the RAM 32, the control unit 31 interrupts the transmission of the printing data from the external device and reads out pattern data from a read-only memory (ROM) 33 which stores pattern data for each character written thereto beforehand in accordance with the printing data based on the printing data for which access has been had to the RAM 32.

Referring to FIGS. 1 and 2 again, the control unit 31 outputs a head release signal to a solenoid drive circuit 34 to energize the solenoid 7. Energization of the solenoid 7 moves the thermal head 13 to an inoperative position in which it is released from pressing engagement with the recording sheet 5 as the guide shaft 6 moves clockwise in rotary movement, in FIG. 1, against the biasing force of the tension spring 11. The control unit 31 also outputs a carriage drive signal to a carriage drive circuit 35 to actuate the carriage drive step-motor so as to move the thermal head to a position in which it is away by one character from the position in which printing is to commence. When the associated parts are in the condition described above, the control unit 41 outputs to a head drive circuit 36 a signal for causing heat to be accumulated in the thermal head 13. The heat signal is lower in voltage than a printing signal, to enable the heat generating elements to generate heat to raise the temperature of the thermal head 13.

Then, the control unit 31 interrupts the output of the head release signal to the solenoid drive circuit 34, to allow the thermal head 13 to be brought into pressing engagement with the recording sheet 5 through the thermal transfer-printing ribbon 14 as the guide shaft 6 is moved counterclockwise in FIG. 1 by the biasing force of the tension spring 11. Thereafter, the control unit 31 outputs a carriage drive signal to the carriage drive circuit 35 to move the carriage 12 in a printing direction along a line in which characters are to be printed; and, at the same time, a printing signal in conformity with the pattern data to the head drive circuit 36, to thereby selectively cause the heat generating elements to generate heat. This melts the coat of thermo-melt ink on the thermal transfer-printing ribbon 2 so that the characters are printed in a dot matrix on the recording sheet 5 in accordance with the printing data.

When one line of characters has been printed on the recording sheet, the control unit 31 allows printing data to be transmitted from the external device again and stores the transmitted data to the RAM 32, and at the same time outputs a head release signal to the solenoid drive circuit 34 to move the thermal head away from the recording sheet 5 as described hereinabove. Then, the control unit 31 outputs a carriage drive signal to the carriage drive circuit 35 to move the carriage 12 to a position in which it is away by one character from the position in which printing is to commence printing characters in the next following line. Thereafter, the control unit 31 outputs a signal to the head drive circuit 36 to cause the head to accumulate heat by causing the heat generating elements to generate heat. Thus, the thermal head 13 is allowed to accumulate heat when a line changing operation is performed while the thermal head 13 is maintained in an inoperative position, to thereby avoid a drop of the temperature of the thermal head 13. While the thermal head 13 is being heated as described hereinabove, the control unit 31 outputs a sheet advance signal to a sheet advance circuit 37 to advance the recording sheet 5 by one line as the sheet advance step-motor 3 is actuated and supplies a ribbon advance signal to a ribbon advance circuit 38 to advance the thermal transfer-printing ribbon 14 a distance corresponding to the length of the line of characters that has been printed.

After the printing sheet 5 and thermal transfer-printing ribbon 2 have been advanced, the control unit 31 moves the carriage 13 in a printing direction in which characters are to be printed in the next following line, so that a printing operation will be performed by the thermal head 13 based on the printing data stored in the RAM 32.

Figure 3:
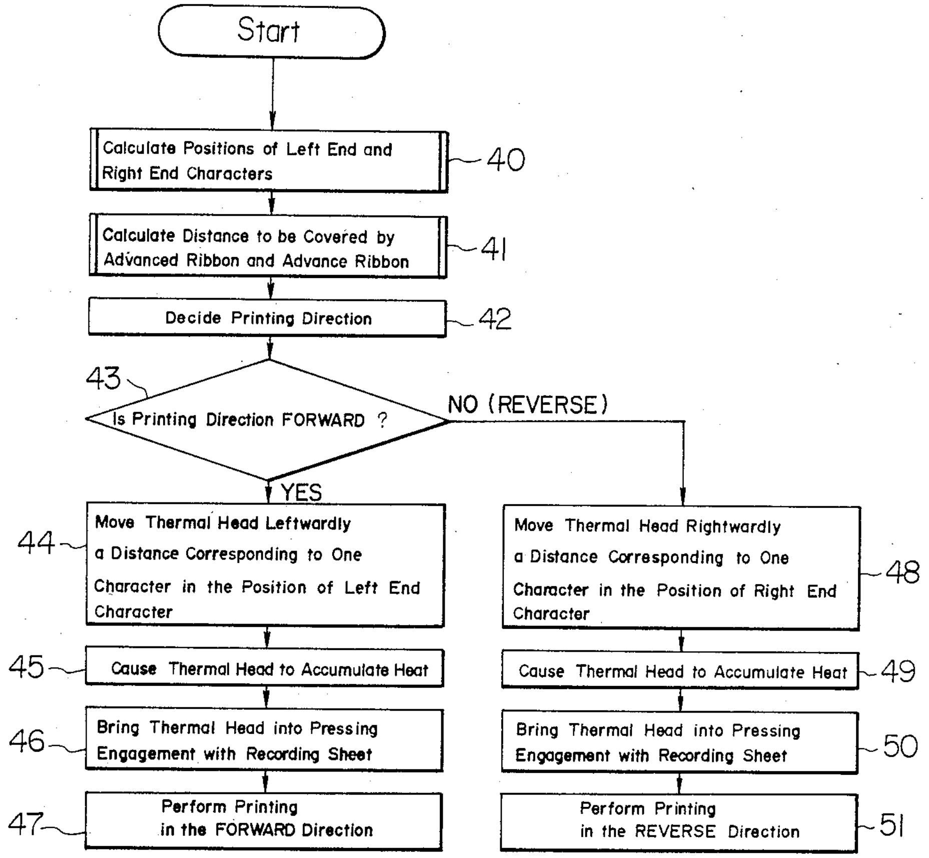
FIG. 3 is a flow chart showing the operation of the thermal head.

The operation of causing the thermal head 13 to accumulate heat prior to commencing the operation of printing each line of characters will be described by referring to FIG. 3.

Before commencing printing characters, the control unit 31 calculates in step 40, the position of a character at the left end of the next following line and the position of a character at the right end thereof which are stored in the RAM 32. Then, in step 41, the distance to be covered by the movement of the thermal transfer-printing ribbon 14 as it is advanced is calculated based on the number of characters to be printed, and the ribbon drive motor 19 is actuated to advance the thermal transfer-printing ribbon 14. In step 42, the control unit 31 decides whether the printing direction is a forward direction from the position of the left end character toward the right end character or a reverse direction from the right end character toward the left end character. Thereafter, in step 43, it is judged whether the printing direction is a forward direction or not. If the judgment is YES, then the control unit 31 moves, in step 44, the thermal head 13 a distance corresponding to one character from the position of the character at the left end of the line to be formed, and outputs, in step 45, a signal for causing the thermal head 13 to accumulate heat to the head drive circuit 36. Thereafter, in step 46, the control unit 31 interrupts the production of a head release signal being supplied to the solenoid drive circuit 34, to bring the thermal head 13 into pressing engagement with the recording sheet 5 through the thermal transfer-printing ribbon 14. Finally, in step 47, the thermal head 13 is moved in the forward direction to perform a printing operation.

Conversely, if the judgment is NO in step 43, then the control unit 31 moves, in step 48, the thermal head 13 a distance corresponding to one character from the position of the character at the right end of the line to be formed, and outputs, in step 49, a signal for causing the thermal head 13 to accumulate heat to the head drive circuit 36. Thereafter, in step 50, the control unit 31 interrupts the production of a head release signal being supplied to the solenoid drive circuit 34, to bring the thermal head 13 into pressing engagement with the recording sheet 5 through the thermal transfer-printing ribbon 14 by the biasing force of the tension spring 11. In step 51, the thermal head 13 is moved in the reverse direction to perform a printing operation.

From the foregoing description, it will be appreciated that in the embodiment of the invention shown and described hereinabove, the thermal head is caused to accumulate heat by a signal for causing the thermal head to accumulate heat which is provided to make the heat generating elements generate heat prior to initiation of a printing operation while the thermal head is away from the recording sheet, to thereby raise the temperature of the thermal head. Thus, the thermal head is maintained at a sufficiently high temperature level to enable characters to be printed clearly on the recording sheet when a printing operation is started again after changing the lines.

While the invention has been described as being incorporated in a thermal printer of the thermal transfer-printing type, it is to be understood that the invention is not limited to this type of thermal printer and that it can have an application in a thermal printer of the heat-sensitive printing type in which printing is performed by causing a color developing layer of a heat-sensitive sheet to develop a color by selectively letting a multiplicity of heat generating elements generate heat.

What is claimed is:

1. A thermal printer comprising:

a thermal head for printing on a recording sheet data transferred to the thermal printer from an external device, wherein the improvement comprises:

means for controlling a printing operation in such a manner that as a unit of printing data is transferred to the thermal printer, a current is applied to the thermal head for heating the thermal head for a predetermined period of time while the thermal head is being maintained out of engagement with the recording sheet, before printing of said unit of printing data is commenced.

2. A thermal printer comprising:

a platen for supporting a recording sheet;

a thermal head including a multiplicity of heat generating elements arranged in one line;

a carriage which supports the thermal head and which is movable along the longitudinal direction of the platen;

holding means for holding the thermal head in an inoperative position which is away from the recording sheet;

actuating means for moving the thermal head from (1) an inoperative position in which the thermal head is spaced away from the recording sheet to (2) an operative position in which the thermal head is brought into contact with said recording sheet under pressure;

a first control means for causing a multiplicity of said heat generating elements of the printing head in an operative position to generate heat selectively to thereby cause the printing head to effect printing on the recording sheet with movement of said carriage;

a second control means for controlling all the heat generating elements of the printing head, said second control means causing said heat generating elements to generate less heat than they are caused to generate by said first control means;

said first control means controlling said heat generating elements when said printing head is in said operative condition and said second control means controlling said heat generating elements when said printing head is in said inoperative condition whereby improved printing quality is obtained from the printing character of the first printing line.

3. A thermal printer as set forth in claim 2, wherein said thermal head is supported for rotary movement with respect to the carriage between said inoperative and operative positions.

4. A thermal printer as set forth in claim 3, wherein said actuating means comprises a solenoid.

* * * * *